US012399681B2

(12) United States Patent
Hansson

(10) Patent No.: US 12,399,681 B2
(45) Date of Patent: *Aug. 26, 2025

(54) IMAGE CAPTURE DEVICE CONTROL USING MOBILE PLATFORM VOICE RECOGNITION

(71) Applicant: GoPro, Inc., San Mateo, CA (US)

(72) Inventor: Per Magnus Fredrik Hansson, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,156

(22) Filed: Aug. 15, 2023

(65) Prior Publication Data

US 2023/0393808 A1 Dec. 7, 2023

Related U.S. Application Data

(63) Continuation of application No. 17/521,412, filed on Nov. 8, 2021, now Pat. No. 11,762,627, which is a continuation of application No. 15/925,040, filed on Mar. 19, 2018, now Pat. No. 11,169,772.

(51) Int. Cl.
*G06F 3/16* (2006.01)
*G10L 15/22* (2006.01)
*H04N 23/60* (2023.01)

(52) U.S. Cl.
CPC .............. *G06F 3/167* (2013.01); *G10L 15/22* (2013.01); *H04N 23/60* (2023.01); *G10L 2015/223* (2013.01)

(58) Field of Classification Search
CPC ... G10L 2015/223; G10L 15/22; G06F 3/167; H04N 5/232
See application file for complete search history.

(56) References Cited

U.S. PATENT DOCUMENTS

| | | | |
|---|---|---|---|
| 9,787,887 B2 | 10/2017 | Boghosian | |
| 9,912,715 B2* | 3/2018 | Xiao | H04L 67/303 |
| 10,127,906 B1* | 11/2018 | Mutagi | H04S 7/40 |
| 10,235,997 B2* | 3/2019 | Shah | H04N 21/4147 |
| 10,270,962 B1* | 4/2019 | Stout | G06V 30/19173 |
| 10,360,910 B2* | 7/2019 | Valentine | H04W 52/0267 |
| 10,560,621 B2* | 2/2020 | Rao | H04N 23/63 |
| 11,169,772 B2 | 11/2021 | Hansson | |
| 12,022,143 B2* | 6/2024 | Rivera | H04N 21/2143 |
| 2006/0215011 A1* | 9/2006 | P. S. | H04M 1/66 |
| | | | 348/14.02 |
| 2013/0124207 A1* | 5/2013 | Sarin | G06F 3/167 |
| | | | 704/E11.001 |
| 2017/0108236 A1* | 4/2017 | Guan | G05B 19/042 |
| 2017/0332035 A1* | 11/2017 | Shah | H04N 21/4147 |
| 2018/0182387 A1* | 6/2018 | Chua | H04R 1/406 |
| 2018/0322870 A1* | 11/2018 | Lee | H04N 21/4394 |
| 2019/0230413 A1* | 7/2019 | Honjo | H04W 76/19 |
| 2019/0286413 A1 | 9/2019 | Hansson | |

(Continued)

*Primary Examiner* — Mohammad K Islam
(74) *Attorney, Agent, or Firm* — Young Basile Hanlon & MacFarlane, P.C.

(57) ABSTRACT

Implementations of a mobile platform for device control may use voice recognition. A user may use a mobile platform, such as a mobile application, on a mobile device to interpret and relay voice commands to a device. Voice recognition services may be integrated into the mobile application, the mobile device operating system (OS), or both.

20 Claims, 5 Drawing Sheets

(56) References Cited

U.S. PATENT DOCUMENTS

| | | | |
|---|---|---|---|
| 2019/0379822 A1* | 12/2019 | Leong | G06F 3/012 |
| 2020/0104094 A1* | 4/2020 | White | G10L 17/00 |
| 2020/0314331 A1* | 10/2020 | Ouchi | G06N 3/08 |
| 2020/0355463 A1* | 11/2020 | Piccioni | A45F 5/021 |
| 2021/0099650 A1* | 4/2021 | Mikawa | G06V 10/147 |
| 2022/0057990 A1 | 2/2022 | Hansson | |

\* cited by examiner

IMAGE CAPTURE DEVICE CONTROL USING MOBILE PLATFORM VOICE RECOGNITION

CROSS-REFERENCE TO RELATED APPLICATION(S)

This application is a continuation of U.S. patent application Ser. No. 17/521,412, filed Nov. 8, 2021, which is a continuation of U.S. patent application Ser. No. 15/925,040, filed Mar. 19, 2018, now U.S. Pat. No. 11,169,772, the entire disclosures of which are hereby incorporated by reference.

TECHNICAL FIELD

This disclosure relates to image capture systems.

BACKGROUND

Image capture systems may be configured to operate via voice control. In certain scenarios, however, the desired audio is masked by noise of various types at the microphone. For example, wind noise, acoustic background noise, and/or noise caused by mount vibrations may interfere with the microphone, thereby causing malfunctions during voice control.

SUMMARY

Disclosed herein are implementations of a mobile platform for image capture device control using voice recognition. In one aspect of an image capture system, a first device may obtain an audio input signal. The first device may include, for example, a user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a machine-to-machine device, or any suitable device. The audio input signal may include voice data.

The first device may determine an input signal control target based on the audio input signal. In response to a determination that the input signal control target is an image capture device, the first device may transmit the audio input signal to a server. The server may be a remote server. The first device may receive a voice analysis signal based on the audio input signal and remote voice data. The first device may generate a command signal based on the voice analysis signal. The command signal may be associated with a voice command of the image capture device.

The first device may transmit the command signal to the image capture device. The command signal may cause the image capture device to perform an action associated with the voice command. In some embodiments, the first device may receive a feedback message from the image capture device. The feedback message may indicate that the action associated with the voice command is completed. The feedback message may an audible signal. In some embodiments, the feedback message may be displayed on a display of the first device.

In some embodiments, the audio input signal may be obtained from a second device via a wireless communication link. For example, the second device may be a Bluetooth headset or any suitable device that is configured to receive audio signals and transmit the audio signals to the first device. In some examples, the second device may receive a feedback message via the wireless communication link.

In another aspect of an image capture system, a first device may obtain an audio input signal. The audio input signal may include voice data. In this aspect, the first device may include a UE, a mobile station, a fixed or mobile subscriber unit, a pager, a cellular telephone, a PDA, a smartphone, a laptop, a netbook, a personal computer, a wireless sensor, consumer electronics, a machine-to-machine device, or any suitable device.

The first device may determine an input signal control target based on the audio input signal. In response to a determination that the input signal control target is an image capture device, the first device may generate a command signal. The command signal may be associated with a voice command of the image capture device.

The first device may transmit the command signal to the image capture device. The command signal may cause the image capture device to perform an action associated with the voice command In some embodiments, the command signal may be generated based on one or more of the audio input signal, stored voice data, and a user activity. The user activity may be determined based on sensor data of the image capture device, sensor data of the first device, or a combination of both.

In yet another aspect of an image capture system, a first device may obtain an audio input signal. The audio input signal may include voice data. The first device may be a mobile station, a fixed or mobile subscriber unit, a pager, a cellular telephone, a PDA, a smartphone, a laptop, a netbook, a personal computer, a wireless sensor, consumer electronics, a machine-to-machine device, or any suitable device.

In this aspect, the first device may determine an input signal control target based on the audio input signal. In response to a determination that the input signal control target is an image capture device mount of the image capture system, the first device may generate a command signal. The command signal may be based on the audio input signal and remote voice data. In some examples, the command signal may be based on the audio input signal and voice data that is stored on the first device. The command signal may be associated with a voice command of the image capture device mount.

The first device may transmit the command signal to the image capture device or the image capture device mount, wherein the command signal causes the image capture device mount to perform an action associated with the voice command. For example, the image capture device mount may adjust a pan angle, a tilt angle, and/or a roll angle based on the voice command.

The first device may receive a feedback message from the image capture device or the image capture device mount, wherein the feedback message indicates whether the action associated with the voice command is completed. In some examples, the feedback message may be an audible signal. In some examples, the feedback message may be displayed on a display of the first device.

In some examples, the audio input signal may be obtained from a second device via a wireless communication link. The second device may be a Bluetooth headset or any suitable device that is configured to receive audio signals and transmit the audio signals to the first device. In some examples, the second device may receive a feedback message via the wireless communication link.

In an aspect, a method for operating an image capture system may include obtaining an audio input signal at a remote device. The audio input signal may include voice data. The method may include generating a command signal based on the audio input signal. The command signal may be associated with a voice command of an image capture device. The voice command may be selected from a list of voice commands. The method may include transmitting the command signal to the image capture device. The command signal may cause the image capture device to configure a setting of the image capture device based on a detected user activity.

An aspect may include an image capture system that includes an image capture device and another device. The other device may be configured to obtain an audio input signal. The audio input signal may include voice data. The other device may generate a command signal based on the audio input signal. The command signal may be associated with a voice command of the image capture device. The voice command may be selected from a list of voice commands based on a detected user activity. The other device may be configured to transmit the command signal to the image capture device. The image capture device may be configured to update a setting of the image capture device responsive to the command signal.

An aspect may include an image capture system that includes an image capture device mount and a remote device. The remote device may be configured to obtain an audio input signal. The audio input signal may include voice data. The remote device may be configured to generate a command signal that is associated with a voice command of the image capture device mount. The voice command may be selected from a list of voice commands based on a detected user activity. The remote device may be configured to transmit the command signal to the image capture device mount. The image capture device mount may be configured to perform an action associated with the detected user activity responsive to the command signal.

An aspect may include a method that includes generating a command signal based on an audio input signal. The command signal may be associated with a voice command of a device. The method may include transmitting the command signal to the device. The command signal may cause the device to configure a setting of the device based on a detected user activity.

An aspect may include a system that includes a first device and a second device. The second device may be configured to generate a command signal based on an audio input signal. The command signal may be associated with a voice command that is associated with a detected user activity. The second device may be configured to transmit the command signal to the first device. The first device may be configured to update a setting of the first device based on the command signal.

An aspect may include an image capture system. The image capture system may include an image capture device mount and a remote device. The remote device may be configured to generate a command signal based on an audio input signal. The command signal may be associated with a voice command of the image capture device mount. The remote device may be configured to transmit the command signal to the image capture device mount. The image capture device mount may be configured to perform an action associated with a detected user activity.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
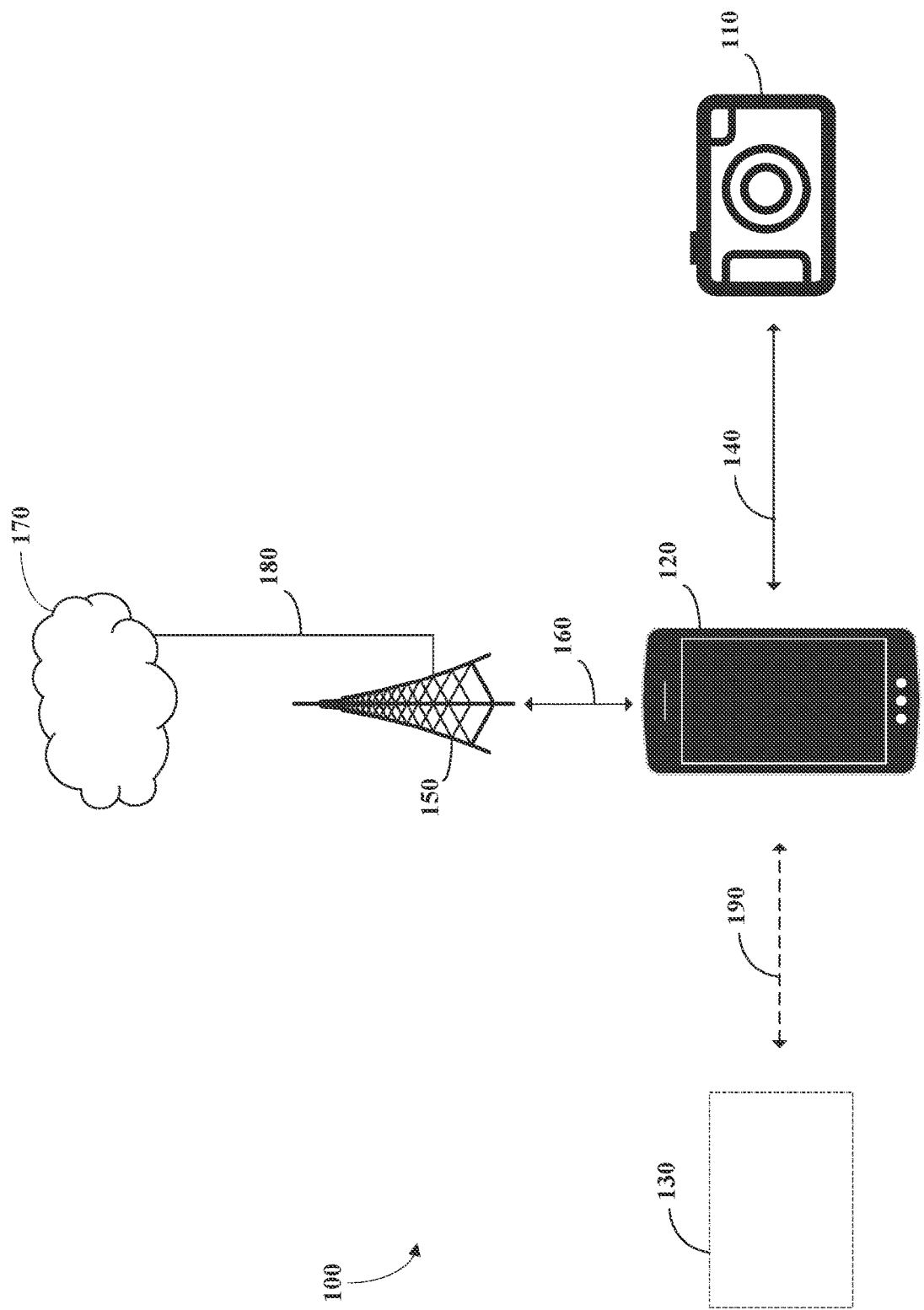
FIG. 1 is a diagram of an example of an image capture system.

A use case may exist where a mobile device, such as a smartphone, is carried by the user to interpret voice commands and relay the voice commands to an image capture device, such as a camera. The user may use a mobile platform, such as a mobile application, on the mobile device to interpret and relay the voice commands to the image capture device. Voice recognition services may be integrated into the mobile application, the mobile device operating system (OS), or both. In some embodiments, the voice recognition services may be server-based.

Voice signals from the user may be detected and obtained by a microphone on the mobile device, on a wired mobile device headset, a wireless headset (i.e., a Bluetooth headset), or a combination thereof. The mobile device may automatically detect that the target for the voice signals is the image capture device using an onboard mobile platform. The onboard mobile platform may be used in conjunction with cloud-based voice services. The mobile platform may include a contextual engine to determine what the user intends the image capture device to perform. The contextual engine may use location data, accelerometer data, speed data, altitude data, temperature data, inertial measurement unit data, or any other suitable data in conjunction with voice data to determine what the user intends the image capture device to perform. The mobile platform may interface with other mobile applications on the mobile device to obtain contextual data. For example, the mobile platform may obtain data from an exercise mobile application in order to determine the user activity. In some embodiments, the contextual engine processing may be performed in the cloud or distributed between the cloud and the mobile device.

The mobile platform allows the user to use a mobile device in severe conditions to use voice commands to communicate with the image capture device. The supported commands may be the same on the mobile device and the image capture device so as not to confuse the user. The mobile platform may support natural language processing and use advanced command interpretation. The advanced command interpretation may be mobile application-based, mobile OS-based, cloud-based, or a combination thereof. The mobile platform described herein may be adapted for use with an image capture device, an image capture device mount, or an image capture device with an integrated mount.

In a first example scenario, the mobile platform may automatically detect that the user is skiing and automatically optimize the image capture device settings for skiing. For example, the mobile platform may use calendar or email data from the mobile device to determine that the user will be on a ski trip on a particular date. The mobile platform may also use, for example, location data, altitude data, speed data, inertial measurement unit data, or a combination thereof, to determine that the user activity is skiing and automatically optimize the image capture device settings accordingly. Image capture device settings include, and are not limited to, capture modes, frame rates, aperture, filters, and resolution. Example capture modes include, and are not limited to, still images, video, slow motion, time lapse, high dynamic range (HDR), and any configurable camera mode. In some embodiments, the automatic user activity detection may be used to narrow the list of potential voice commands and enable faster voice processing.

In a second example scenario, the mobile platform may be configured to control an image capture device mount. For example, the user may attach an image capture device mount with an image capture device to an external surface of a vehicle, for example, an automobile or boat. From inside the vehicle, the user may use the mobile platform to speak voice commands into a mobile device to control an action of the image capture device mount. For example, if the user wishes to adjust a tilt angle of the image capture device mount, the user may use a natural language voice command such as "Increase camera tilt angle 30 degrees."

FIG. 1 is a diagram of an example of an image capture system 100. The image capture system 100 includes an image capture device 110 and a mobile device 120. The image capture device 110 may be, for example, a camera that is configured to capture still images, panoramic images, spherical images, video, audio, or any combination thereof. The mobile device 120 may include, for example, a user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a machine-to-machine device, or any suitable device.

In some embodiments, the image capture device 110 may include a static or motorized mount (not shown). Some embodiments may include a peripheral device 130. The peripheral device 130 may be, for example, a wired or wireless headset, a wired or wireless microphone, a Bluetooth module, another mobile device, or any suitable device.

As shown in FIG. 1, the mobile device 120 is configured to communicate with the image capture device 110 via a communication link 140. The communication link 140 may be, for example, Bluetooth, near-field communication (NFC), 802.11, WiMAX, asynchronous transfer mode (ATM), InfiniBand, PCI Express Advanced Switching, and/or other communication technologies. In some implementations, the communication link 140 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols. The mobile device 120 is configured to communicate with a base station 150 via a communication link 160. The communication link 160 may be, for example, 802.11, WiMAX, 3GPP, LTE, ATM, InfiniBand, PCI Express Advanced Switching, and/or other communication technologies. In some implementations, the communication link 160 may communicate using networking protocols, such as MPLS, TCP/IP, UDP, HTTP, SMTP, FTP, and/or other networking protocols. The base station 150 is configured to communicate with the Internet 170 via a communication link 180. The Internet 170 may include a global system of interconnected computer networks and devices that use common communication protocols, such as the transmission control protocol (TCP), UDP, and the Internet protocol (IP) in the TCP/IP Internet protocol suite. When present, the peripheral device 130 may communicate with the mobile device 120 via a communication link 190. The communication link 190 may be, for example, Bluetooth, NFC, 802.11, WiMAX, ATM, InfiniBand, PCI Express Advanced Switching, and/or other communication technologies. In some implementations, the communication link 190 may communicate using networking protocols, such as MPLS, TCP/IP, UDP, HTTP, SMTP, FTP, and/or other networking protocols.

Figure 2:
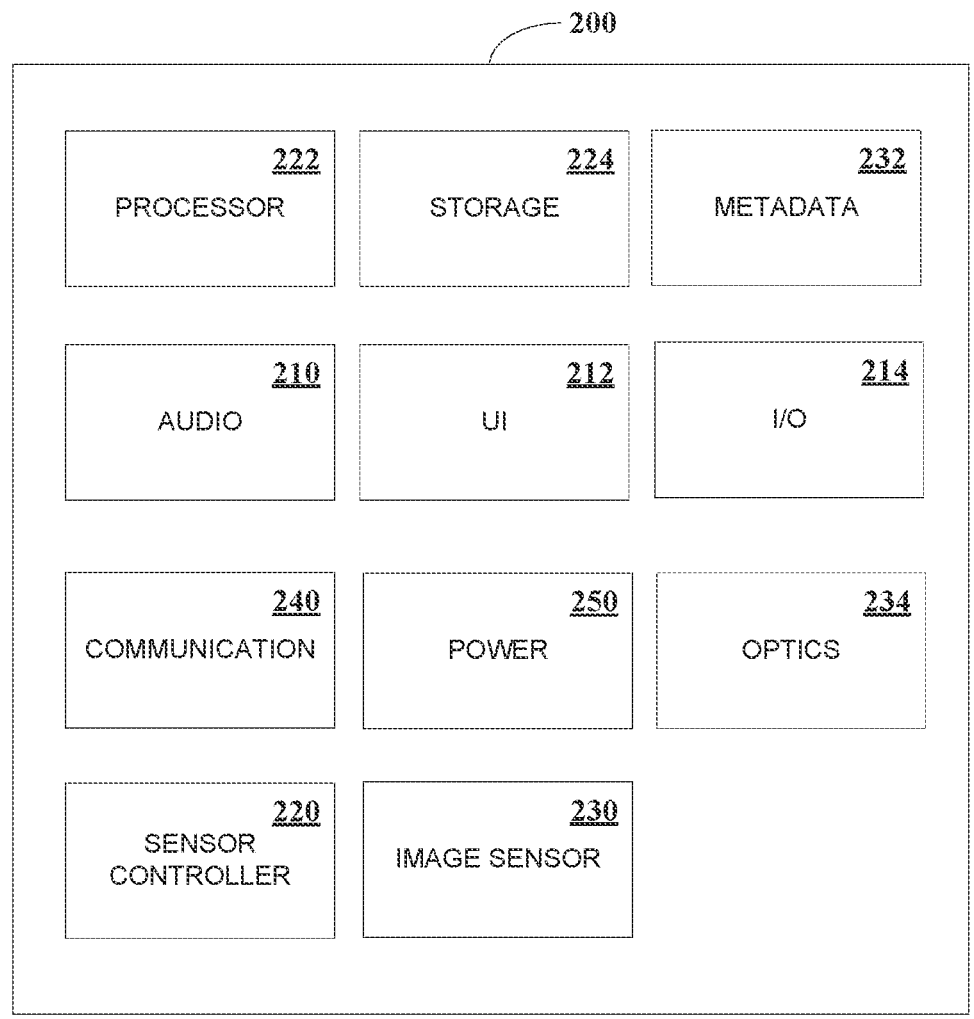
FIG. 2 is a diagram of an example of an image capture device.

FIG. 2 is a diagram of an example of an image capture device 200. In some implementations, an image capture device 200 may be an action camera that includes an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof, audio information, such as sound waves. The audio information may be associated with, or stored in association with, image or video content contemporaneously captured by the image capture device 200. In some implementations, audio information may be encoded using, for example, Advanced Audio Coding (AAC), Audio Compression—3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (such as buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof; connection status information, such as connected, wireless, wired, or a combination thereof; power mode information, such as standby mode information, sensor mode information, video mode information, or a combination thereof; information related to other information sources, such as heart rate information, global positioning system information, or a combination thereof; and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, an NFC interface, an Ethernet interface, a radio frequency transceiver interface, and/or other interfaces, for communication with one or more external devices, such as a mobile device, such as the mobile device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrently with recording a video. In some implementations, video information may include multiple frames of pixels and may be encoded using an encoding method, such as H.264, H.265, CineForm, and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222, may execute an instruction to perform one or more, or portions of one or more, of the operations described herein. The electronic storage unit 224 may include storage memory for storing content, such as metadata, images, audio, or a combination thereof, captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide-semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection and Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information, including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200, such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics components. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, for example, a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular Long Term Evolution (LTE), communications interface for communication between the image capture device 200 and a remote device, such as the mobile device 120 in FIG. 1. The communication unit 240 may communicate using, for example, Ethernet, 802.11, worldwide interoperability for microwave access (WiMAX), Third Generation Partnership Project (3GPP), LTE, digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera, a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200. Multiple mechanical, sensory, or electrical units may be controlled by a learning apparatus via network/radio connectivity.

Figure 3:
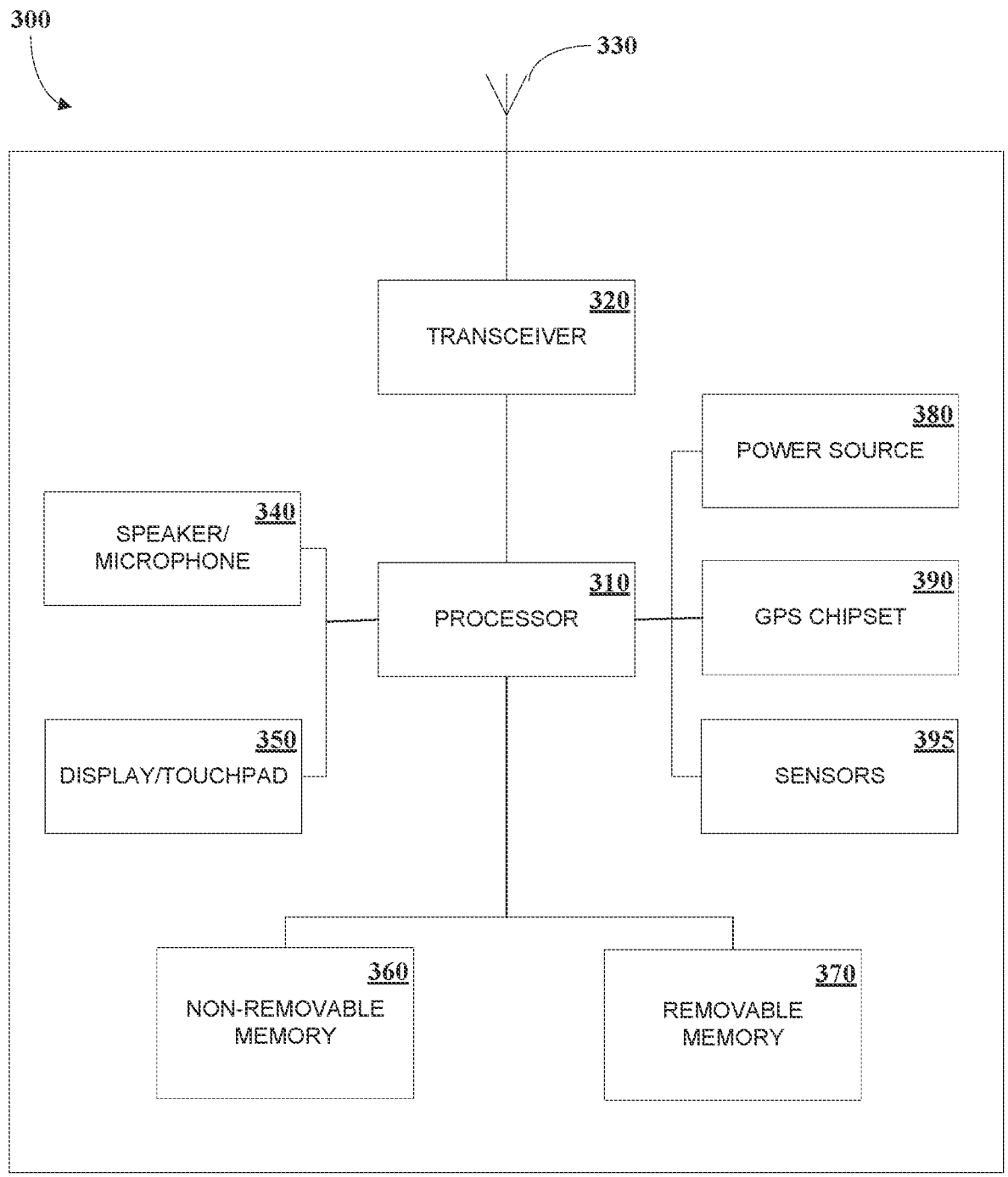
FIG. 3 is a diagram of an example of a mobile device.

FIG. 3 is a diagram of an example of a mobile device 300. As shown in FIG. 3, the mobile device 300 may include a processor 310, a transceiver 320, an antenna 330, a speaker/microphone 340, a display/touchpad 350, non-removable memory 360, removable memory 370, a power source 380, a global positioning system (GPS) chipset 390, and one or more sensors 395. Although the speaker/microphone 340 is shown as a single unit in FIG. 3, some embodiments may be configured with separate and independent speaker and microphone units. The one or more sensors 395 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. It will be appreciated that the mobile device 300 may include any sub-combination of the foregoing elements while remaining consistent with an embodiment.

The processor 310 may be a general-purpose processor, a special-purpose processor, a conventional processor, a natural language processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 310 may perform signal coding, data processing, power control, input/output processing, and/or any other functionality that enables the mobile device 300 to operate in a wireless environment. The processor 310 may be coupled to the transceiver 320, which may be coupled to the antenna 330. While FIG. 3 depicts the processor 310 and the transceiver 320 as separate components, it will be appreciated that the processor 310 and the transceiver 320 may be integrated together in an electronic package or chip.

The antenna 330 may be configured to transmit signals to, or receive signals from, a base station. For example, in one embodiment, the antenna 330 may be an antenna configured to transmit and/or receive RF signals. It will be appreciated that the antenna 330 may be configured to transmit and/or receive any combination of wireless signals. For example, the antenna 330 may communicate using Bluetooth, near-field communication (NFC), 802.11, WiMAX, 3GPP, LTE, asynchronous transfer mode (ATM), InfiniBand, PCI Express Advanced Switching, and/or other communication technologies. In some implementations, the antenna 330 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

In addition, although the antenna 330 is depicted in FIG. 3 as a single element, the mobile device 300 may include any number of antennas 330. More specifically, the mobile device 300 may employ multiple-input, multiple-output (MIMO) technology. Thus, in one embodiment, the mobile device 300 may include two or more antennas 330 (e.g., multiple antennas) for transmitting and receiving wireless signals.

The transceiver 320 may be configured to modulate the signals that are to be transmitted by the antenna 330 and to demodulate the signals that are received by the antenna 330. As noted above, the mobile device 300 may have multi-mode capabilities. Thus, the transceiver 320 may include multiple transceivers for enabling the mobile device 300 to communicate via multiple radio technologies, such as LTE and 802.11, for example.

The processor 310 of the mobile device 300 may be coupled to, and may receive user input data from, the speaker/microphone 340 and/or the display/touchpad 350 (e.g., a liquid crystal display (LCD) display unit or organic light-emitting diode (OLED) display unit). The processor 310 may also output user data to the speaker/microphone 340 and/or the display/touchpad 350. In addition, the processor 310 may access information from, and store data in, any type of suitable memory, such as the non-removable memory 360 and/or the removable memory 370. The non-removable memory 360 may include random-access memory (RAM), read-only memory (ROM), a hard disk, or any other type of memory storage device. The removable memory 370 may include a subscriber identity module (SIM) card, a memory stick, a secure digital (SD) memory card, and the like. In other embodiments, the processor 310 may access information from, and store data in, memory that is not physically located on the mobile device 300, such as on a server or a desktop/laptop computer (not shown).

The processor 310 may receive power from the power source 380, and may be configured to distribute and/or control the power to the other components in the mobile device 300. The power source 380 may be any suitable device for powering the mobile device 300. For example, the power source 380 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or any suitable material.

The processor 310 may also be coupled to the GPS chipset 390, which may be configured to provide location information (e.g., longitude and latitude) regarding the current location of the mobile device 300. In addition to, or in lieu of, the information from the GPS chipset 390, the mobile device 300 may receive location information from a base station and/or determine its location based on the timing of the signals being received from two or more nearby base stations. It will be appreciated that the mobile device 300 may acquire location information by way of any suitable location-determination method while remaining consistent with an embodiment.

Figure 4:
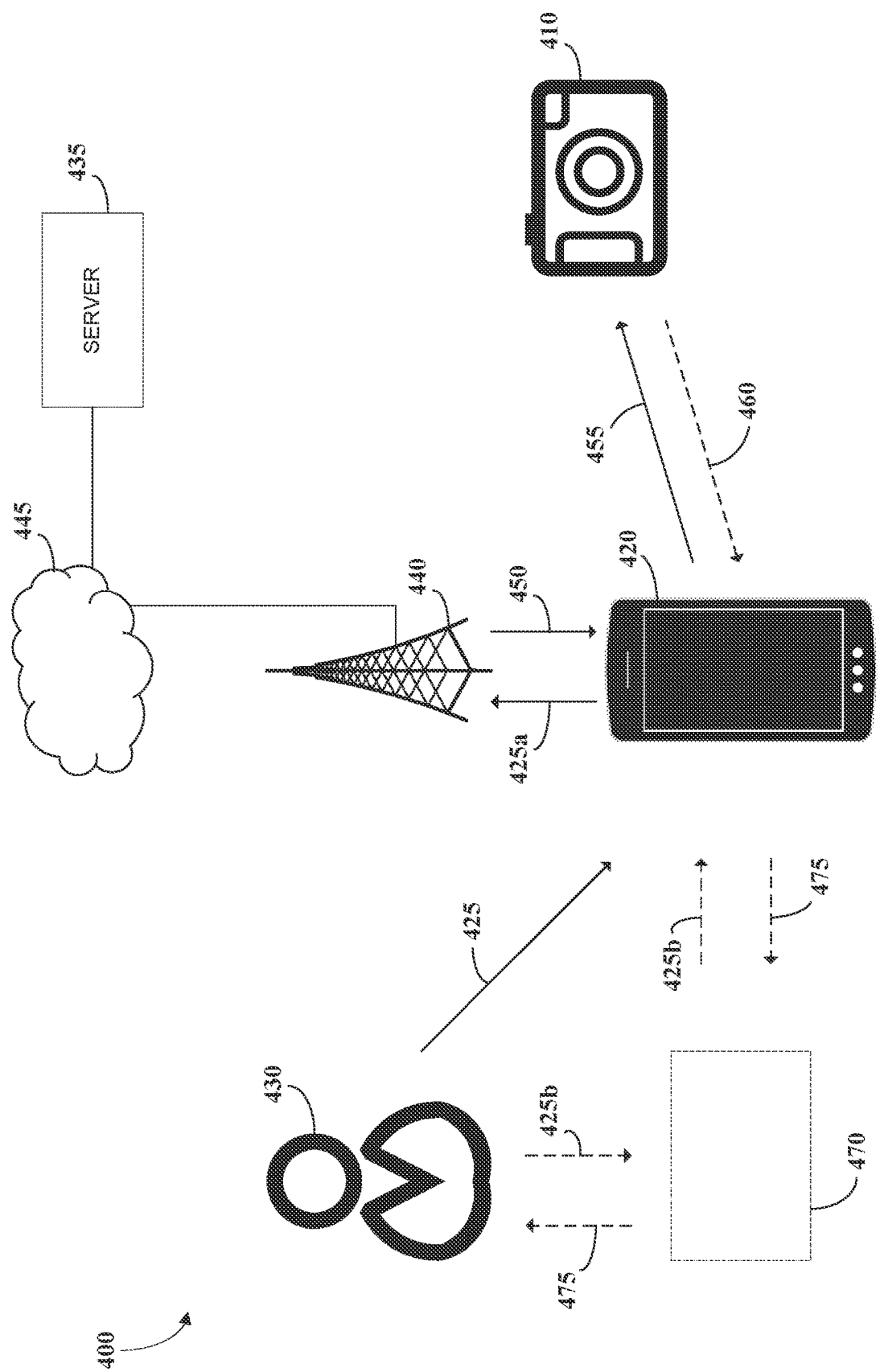
FIG. 4 is a signal diagram of an example of an image capture system using a mobile platform-based voice recognition.

FIG. 4 is a signal diagram of an example of an image capture system 400 using a mobile platform-based voice recognition. The mobile platform may be used to replicate an image capture device functionality on a mobile device 420. As shown in FIG. 4, the image capture system 400 includes an image capture device 410 and a mobile device 420. The mobile device 420 obtains an audio input signal 425. The audio input signal 425 may include voice data from a user 430 and ambient audio. The audio input signal 425 may be obtained by the mobile device 420 via an integrated microphone (not shown). A processor of the mobile device 420 determines a control target for the audio input signal 425. For example, the mobile device 420 may determine that the target for the audio input signal 425 is the image capture device 410 based on a trigger word or phrase in the audio input signal 425.

Referring to FIG. 4, in response to a determination that the target for the audio input signal 425 is the image capture device 410, the mobile device 420 transmits the audio input signal 425 as an audio input signal 425a to a remote server 435 via a base station 440 and the Internet 445. In this example, the audio input signal 425a is transmitted as a cellular signal; however, it is understood that any suitable signal may be used.

The remote server 435 processes the audio input signal 425a, for example, using natural language processing and generates a voice analysis signal 450. The remote server 435 may use stored voice data to analyze the audio input signal 425a and generate the voice analysis signal 450. The voice data may be stored on the remote server 435 or obtained from another device via the Internet 445. The voice analysis signal 450 may be an analytical interpretation of the audio input signal 425*a*, such as a voice-to-text signal. The voice analysis signal 450 is transmitted to the mobile device 420 via the Internet 445 and the base station 440. In this example, the voice analysis signal 450 is received by the mobile device 420 as a cellular signal; however, it is understood that any suitable signal may be used.

In this example, the mobile device 420 receives the voice analysis signal 450 and processes the voice analysis signal 450 by associating it with a voice command of the image capture device 410 to generate a command signal 455. The mobile device 420 transmits the command signal 455 to the image capture device 410. In this example, the command signal 455 is transmitted as an 802.11 signal to the image capture device 410; however, it is understood that any suitable signal may be used. The image capture device 410 receives the command signal 455 and performs an action associated with the voice command In some embodiments, the command signal 455 may be generated at the remote server 435.

In some embodiments, the image capture device 410 may transmit a feedback message 460. The feedback message 460 may indicate whether the action associated with the voice command has been successfully completed. The feedback message 460 may cause an audible sound or provide visual feedback, such as a light, graphical icon, or text message on a display of the mobile device 420.

In some embodiments, an audio input signal 425*b* may be obtained by the mobile device 420 using a peripheral device 470, for example, a Bluetooth headset. The peripheral device 470 may transmit the audio input signal 425*b* wirelessly, as shown in FIG. 4, or it may transmit the audio input signal 425*b* via a wired connection. The mobile device 420 may transmit a feedback message 475 to the peripheral device 470. The feedback message 475 may indicate whether the action associated with the voice command has been successfully completed. The feedback message 475 may cause an audible sound or provide visual feedback, such as a light, graphical icon, or text message on a display of the peripheral device 470. The user 430 may receive the feedback message 475. If the user 430 is satisfied with the action performed, the user 430 may provide feedback in a suitable form, for example, audio input signal 425. The mobile device 420 may use the feedback from the user 430 to update a voice model and learn voice commands over time. In implementations where an image capture device mount is used, voice commands may be used to adjust a pan angle of the mount, a tilt angle of the mount, and/or a roll angle of the mount.

Figure 5:
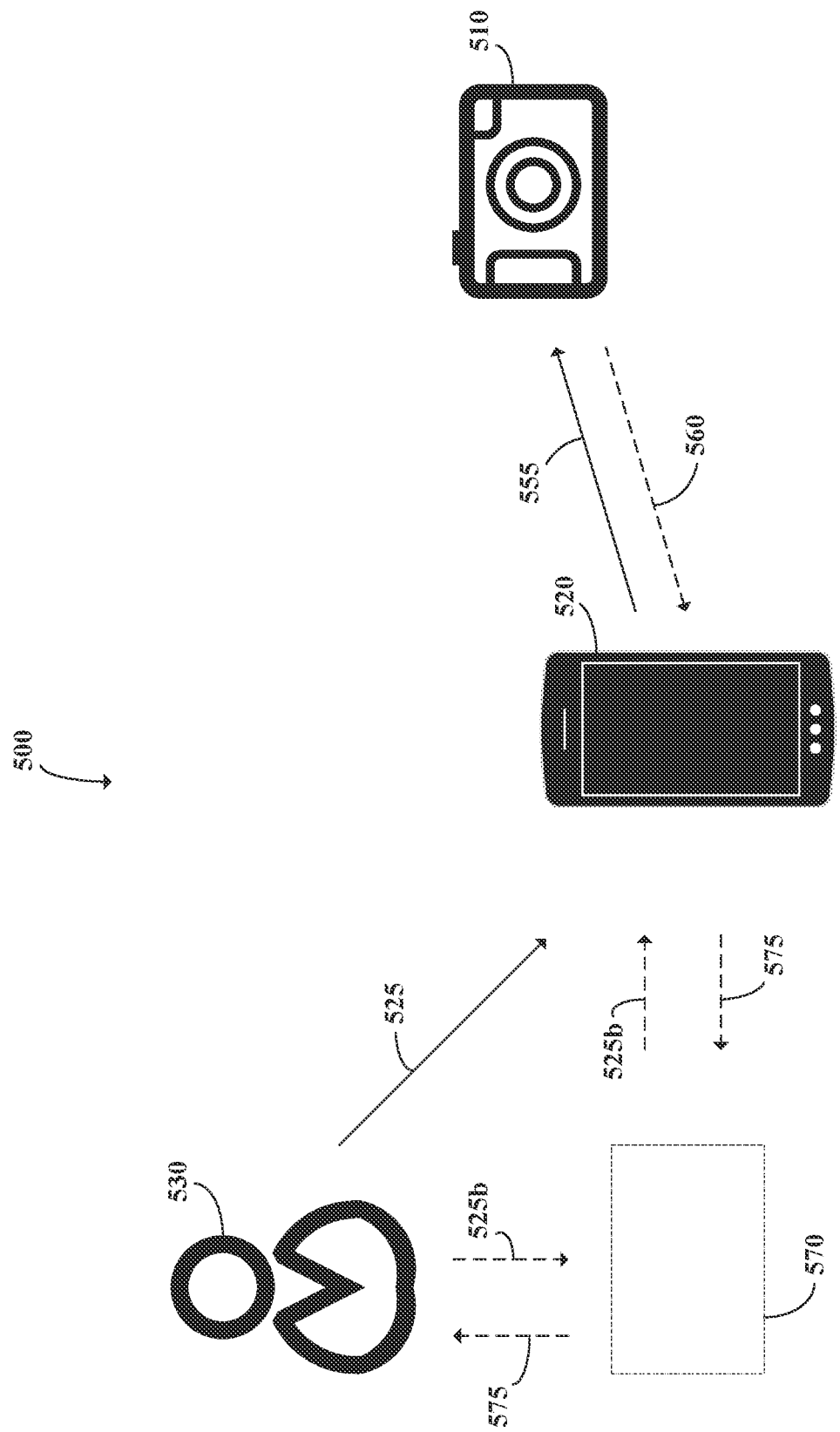
FIG. 5 is a signal diagram of another example of an image capture system using a mobile platform-based voice recognition.

FIG. 5 is a signal diagram of another example of an image capture system 500 using a mobile platform-based voice recognition. The mobile platform may be used to replicate an image capture device functionality on a mobile device 520. In this example, the mobile device 520 has a poor signal or no signal and therefore does not have access to a remote server.

As shown in FIG. 5, the image capture system 500 includes an image capture device 510 and a mobile device 520. The mobile device 520 obtains an audio input signal 525. The audio input signal 525 may include voice data from a user 530 and ambient audio. The audio input signal 525 may be obtained by the mobile device 520 via an integrated microphone (not shown). A processor of the mobile device 520 determines a control target for the audio input signal 525. For example, the mobile device 520 may determine that the target for the audio input signal 525 is the image capture device 510 based on a trigger word or phrase in the audio input signal 525.

Referring to FIG. 5, in response to a determination that the target for the audio input signal 525 is the image capture device 510, the mobile device 520 processes the audio input signal 525 by associating it with a voice command of the image capture device 510 to generate a command signal 555. The mobile device 520 transmits the command signal 555 to the image capture device 510. In this example, the command signal 555 is transmitted as an 802.11 signal to the image capture device 510; however, it is understood that any suitable signal may be used. The image capture device 510 receives the command signal 555 and performs an action associated with the voice command. The mobile device 520 may use stored voice data to analyze the audio input signal 525.

In some embodiments, the image capture device 510 may transmit a feedback message 560. The feedback message 560 may indicate whether the action associated with the voice command has been successfully completed. The feedback message 560 may cause an audible sound or provide visual feedback, such as a light, graphical icon, or text message on a display of the mobile device 520.

In some embodiments, an audio input signal 525*b* may be obtained by the mobile device 520 using a peripheral device 570, for example, a Bluetooth headset. The peripheral device 570 may transmit the audio input signal 525*b* wirelessly, as shown in FIG. 5, or it may transmit the audio input signal 525*b* via a wired connection. The mobile device 520 may transmit a feedback message 575 to the peripheral device 570. The feedback message 575 may indicate whether the action associated with the voice command has been successfully completed. The feedback message 575 may cause an audible sound or provide visual feedback, such as a light, graphical icon, or text message on a display of the peripheral device 570. The user 530 may receive the feedback message 575. If the user 530 is satisfied with the action performed, the user 530 may provide feedback in a suitable form, for example, audio input signal 525. The mobile device 520 may use the feedback from the user 530 to update a voice model and learn voice commands over time. In implementations where an image capture device mount is used, voice commands may be used to adjust a pan angle of the mount, a tilt angle of the mount, and/or a roll angle of the mount.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    receiving, at a first device, a voice-to-text signal associated with an audio input signal via a cellular channel;
    generating, at the first device, a command signal based on the audio input signal, the command signal associated with a voice command of a second device; and
    transmitting the command signal to the second device, wherein the command signal causes the second device to configure a time lapse capture mode of the second device based on a user activity that is determined based on accelerometer data including a velocity vector.

2. The method of claim 1, further comprising:
    receiving a feedback message from the device, wherein the feedback message indicates that an action associated with the voice command is completed.

3. The method of claim 2, wherein the feedback message is an audible signal.

4. The method of claim 2, wherein the feedback message is displayed on a display of a remote device.

5. The method of claim 1, wherein the command signal is generated based on the audio input signal, voice data, and the user activity.

6. The method of claim 1, wherein the time lapse capture mode is a high dynamic range (HDR) mode.

7. A system, comprising:
a first device; and
a second device configured to:
receive a voice-to-text signal associated with an audio input signal via a cellular channel;
generate, based on the audio input signal, a command signal associated with a voice command that is associated with a user activity that is determined based on accelerometer data that includes an acceleration vector; and
transmit the command signal to the first device,
wherein the first device is configured to update a time lapse capture mode of the first device based on the command signal.

8. The system of claim 7, wherein the command signal is generated based on the audio input signal and voice data.

9. The system of claim 8, wherein the command signal is generated based on the audio input signal, the voice data, and the user activity.

10. The system of claim 9, wherein the accelerometer data is associated with the first device.

11. The system of claim 9, wherein the accelerometer data is associated with the second device.

12. An image capture system, the system comprising:
a device mount configured to couple to an image capture device; and
a remote device configured to:
receive a voice-to-text signal associated with an audio input signal via a cellular channel;
generate, based on the audio input signal, a command signal that is associated with a voice command of the device mount; and
transmit the command signal to the device mount,
wherein the device mount is configured to switch to a slow-motion mode based on speed data.

13. The image capture system of claim 12, wherein the remote device is configured to receive a feedback message from the device mount, and wherein the feedback message indicates that an action associated with the voice command is completed.

14. The image capture system of claim 13, wherein the feedback message is an audible signal.

15. The image capture system of claim 13, wherein the feedback message is displayed on a display of the remote device.

16. The image capture system of claim 12, wherein the speed data is associated with the device mount.

17. The image capture system of claim 16, wherein the speed data is associated with the remote device.

18. The image capture system of claim 12, wherein the command signal is associated with a pan angle adjustment of the device mount.

19. The image capture system of claim 12, wherein the command signal is associated with a tilt angle adjustment of the device mount.

20. The image capture system of claim 12, wherein the command signal is associated with a roll angle adjustment of the device mount.

* * * * *